US012544237B2

(12) United States Patent
Yadav et al.

(10) Patent No.: US 12,544,237 B2
(45) Date of Patent: Feb. 10, 2026

(54) EXPANDABLE INTERBODY

(71) Applicant: MiRus LLC, Marietta, GA (US)

(72) Inventors: Jay Yadav, Marietta, GA (US); Wayne Gray, Marietta, GA (US); Noah Roth, Marietta, GA (US)

(73) Assignee: MiRus LLC, Marietta, GA (US)

( * ) Notice: Subject to any disclaimer, the term of this patent is extended or adjusted under 35 U.S.C. 154(b) by 1060 days.

(21) Appl. No.: 17/578,899

(22) Filed: Jan. 19, 2022

(65) Prior Publication Data

US 2022/0168116 A1 Jun. 2, 2022

Related U.S. Application Data

(63) Continuation-in-part of application No. 29/757,564, filed on Nov. 6, 2020, now Pat. No. Des. 946,152, and a continuation-in-part of application No. 29/757,561, filed on Nov. 6, 2020, now Pat. No. Des. 946,151, and a continuation-in-part of application No. 16/147,986, filed on Oct. 1, 2018, now Pat. No. 11,278,423.

(60) Provisional application No. 62/565,336, filed on Sep. 29, 2017.

(51) Int. Cl.
*A61F 2/44* (2006.01)
*A61F 2/30* (2006.01)

(52) U.S. Cl.
CPC ............ *A61F 2/447* (2013.01); *A61F 2/4425* (2013.01); *A61F 2002/30471* (2013.01); *A61F 2002/30507* (2013.01); *A61F 2002/443* (2013.01)

(58) Field of Classification Search
CPC .............. A61F 2/4425; A61F 2/447; A61F 2002/30471; A61F 2002/30507; A61F 2002/443
See application file for complete search history.

(56) References Cited

U.S. PATENT DOCUMENTS

| 6,126,689 | A  | 10/2000 | Brett |
| 6,443,989 | B1 | 9/2002  | Jackson |
| 6,773,460 | B2 | 8/2004  | Jackson |
| 6,819,093 | B1 | 11/2004 | Kay |
| 7,128,760 | B2 | 10/2006 | Michelson |
| 7,731,751 | B2 | 6/2010  | Butler et al. |
| 7,763,028 | B2 | 7/2010  | Lim et al. |

(Continued)

FOREIGN PATENT DOCUMENTS

WO 2018-053403 3/2018

OTHER PUBLICATIONS

Globus Medical, RISE, titanium expandable lumbar fusion device, available at www.globusmedical.com/portfolio/rise, last accessed May 20, 2019, 3 pages.

(Continued)

*Primary Examiner* — Sameh R Boles
(74) *Attorney, Agent, or Firm* — UB Greensfelder LLP; Brian E. Turung

(57) ABSTRACT

An expandable interbody device used as a prosthesis during spinal surgery. The expandable interbody device is configured to be inserted into the space between spinal disks to provide stability. The expandable interbody device includes a drive block, a linkage block, a drive screw, a first endplate, a second endplate, and at least two linkages. Rotation of the drive screw causes movement of the linkage block relative to the drive block and/or movement of the first endplate relative to the second endplate.

26 Claims, 8 Drawing Sheets

(56) References Cited

U.S. PATENT DOCUMENTS

| | | |
|---|---|---|
| 7,828,849 B2 | 11/2010 | Lim |
| 7,951,199 B2 | 5/2011 | Miller |
| 8,043,381 B2 | 10/2011 | Hestad et al. |
| 8,105,382 B2 | 1/2012 | Olmos et al. |
| 8,486,149 B2 | 7/2013 | Saidha et al. |
| 8,491,659 B2 | 7/2013 | Weiman |
| 8,523,944 B2 | 9/2013 | Jimenez et al. |
| 8,574,300 B2 | 11/2013 | McManus et al. |
| 8,628,577 B1 | 1/2014 | Jimenez |
| 8,628,578 B2 | 1/2014 | Miller et al. |
| 8,632,593 B2 | 1/2014 | Suh et al. |
| 8,715,351 B1 | 5/2014 | Pinto |
| 8,795,366 B2 | 8/2014 | Varela |
| 8,845,731 B2 | 9/2014 | Weiman |
| 8,852,279 B2 | 10/2014 | Weiman |
| 8,888,854 B2 | 11/2014 | Glerum et al. |
| 8,894,711 B2 | 11/2014 | Varela |
| 8,940,049 B1 | 1/2015 | Jimenez et al. |
| 9,034,041 B2 | 5/2015 | Wolters et al. |
| 9,186,258 B2 | 11/2015 | Davenport et al. |
| 9,198,772 B2 | 12/2015 | Weiman |
| 9,233,007 B2 | 1/2016 | Sungarian et al. |
| 9,278,008 B2 | 3/2016 | Perloff et al. |
| 9,393,130 B2 | 7/2016 | Suddaby et al. |
| 9,445,919 B2 | 9/2016 | Palmatier et al. |
| 9,486,328 B2 | 11/2016 | Jimenez et al. |
| 9,549,824 B2 | 1/2017 | McAfee |
| 9,554,918 B2 | 1/2017 | Weiman |
| 9,561,116 B2 | 2/2017 | Weiman et al. |
| 9,867,717 B2 | 1/2018 | Jimenez |
| 9,913,727 B2 | 3/2018 | Thommen |
| 9,924,972 B2 | 3/2018 | Yue |
| 10,137,006 B2 * | 11/2018 | Dewey .................. A61F 2/4611 |
| 10,687,963 B2 | 6/2020 | Jimenez et al. |
| 11,471,301 B2 | 10/2022 | Jimenez et al. |
| 2013/0190876 A1 | 7/2013 | Drochner et al. |
| 2014/0336764 A1 | 11/2014 | Masson |
| 2015/0272743 A1 * | 10/2015 | Jimenez .................. A61F 2/447 623/17.16 |
| 2016/0051384 A1 | 2/2016 | Patel |
| 2016/0166396 A1 * | 6/2016 | McClintock ............ A61F 2/446 623/17.16 |
| 2017/0112630 A1 | 4/2017 | Kuyler et al. |
| 2017/0224505 A1 | 8/2017 | Butler et al. |
| 2017/0281361 A1 | 10/2017 | Jimenez et al. |
| 2017/0367842 A1 | 12/2017 | Predick et al. |
| 2019/0008995 A1 | 1/2019 | Roth |
| 2019/0133784 A1 | 5/2019 | Gunn et al. |
| 2023/0000641 A1 | 1/2023 | Jimenez et al. |

OTHER PUBLICATIONS

K2M Complex Spine Innovations, Mojave™ PL 3D Expandable Interbody System—K2M, available at https://www.k2m.com/products/product/mojave-pl-3d/, last accessed May 20, 2019, 1 page.

K2M Complex Spine Innovations, K2M Announces US Launch of First-to-Market 3D-Printed Expandable Interbody Mojave™ PL 3D Expandable Featuring Lamellar 3D Titanium Technology™, May 16, 2018, 2 pages.

Non-Final Office Action in connection to U.S. Appl. No. 16/422,200, dated Feb. 1, 2021.

* cited by examiner

| Block Spacing | % Expanded | Anterior Height | Posterior Height | Lordosis |
|---|---|---|---|---|
| 5.9 | 0% | 8.5 | 6.9 | 5.9 |
| 5.31 | 10% | 10.5 | 7.8 | 9.7 |
| 4.72 | 20% | 11.9 | 8.4 | 12.6 |
| 4.13 | 30% | 13.1 | 8.9 | 14.9 |
| 3.54 | 40% | 14.0 | 9.3 | 16.9 |
| 2.95 | 50% | 14.9 | 9.7 | 18.6 |
| 2.36 | 60% | 15.6 | 10.0 | 20.1 |
| 1.77 | 70% | 16.2 | 10.3 | 21.3 |
| 1.18 | 80% | 16.7 | 10.5 | 22.4 |
| 0.59 | 90% | 17.2 | 10.7 | 23.3 |
| 0.00 | 100% | 17.5 | 10.8 | 24.0 |

EXPANDABLE INTERBODY

The present disclosure is a continuation-in-part of United States Design patent application Ser. Nos. 29/757,561 and 29/757,564, both filed Nov. 6, 2020, which are all incorporated herein by reference.

The present disclosure is also a continuation-in-part of U.S. patent application Ser. No. 16/147,986 filed Oct. 1, 2018, which in turn claims the benefit of U.S. provisional patent application No. 62/565,336, filed on Sep. 29, 2017, and entitled "Expandable Interbody Devices," the disclosure of which is expressly incorporated herein by reference in its entirety.

An expandable interbody device that can be used as a prosthesis during spinal surgery. The expandable interbody device is configured to be inserted into the space between spinal disks to provide stability. The expandable interbody device can be introduced between vertebrae of a patient's spine for fixation with bone to immobilize the joint as part of a surgical treatment.

BACKGROUND

Intervertebral fusion devices for the cervical and lumbar spine have been used for many years. These devices are originally inserted into a disc space after the coring out a bone graft from the hip. This technique currently not commonly practice due to disadvantages such as lengthy operation times, destruction of a large portion of the disc space, high risk of nerve injury, and hip pain after harvesting the bone graft.

A current device commonly used to perform the intervertebral portion of an intervertebral body fusion is an intervertebral body fusion device and a distraction device.

The intervertebral body fusion device can be implanted as a standalone device or implanted in combination with other devices such as pedicle screws and rods. The intervertebral body fusion device distracts a collapsed disc, decompresses the nerve root, and allows load sharing to enhance bone formation. The intervertebral body fusion device is configured to be small enough to allow implantation with minimal retraction and pulling on nerves.

In a typical intervertebral body fusion procedure, a portion of the intervertebral disc is first removed from between the vertebral bodies. The distraction device is then inserted into the cleared space to enlarge the disc space and the vertebral bodies are separated by the distraction device. Thereafter, the intervertebral fusion device is inserted into the distracted space. U.S. Pat. No. 9,486,328 discloses one prior art distraction device.

The present disclosure is directed to an improved distraction device.

SUMMARY OF DISCLOSURE

The present disclosure is directed to an expandable interbody device that can be used as a prosthesis used during spinal surgery. The expandable interbody device is configured to be inserted into the space between spinal disks to provide stability. The expandable interbody device can be introduced between vertebrae of a patient's spine (e.g., in the disk space between adjacent vertebrae) for fixation with bone to immobilize the joint as part of a surgical treatment.

In one non-limiting embodiment, the expandable interbody device includes a drive block, a linkage block, a drive screw, a first endplate, a second endplate, and at least two linkages. The drive block optionally at least partially forms or includes a drive block opening. The linkage block optionally at least partially forms or includes a linkage block opening. The drive screw is rotatably coupled at least partially in the drive block opening or linkage block opening and is threadingly disposed within the other of the linkage block opening or the drive block opening. At least one linkage rotatably couples the linkage block to the first endplate, and at least one other linkage rotatably couples the linkage block to the second endplate. Rotation of the drive screw causes movement of the linkage block relative to the drive block and movement of the first endplate relative to the second endplate. The drive block and/or the linkage block optionally includes a block engagement arrangement. The first endplate optionally includes a first endplate engagement arrangement. The second endplate optionally includes a second endplate engagement arrangement. The first and/or second endplate engagement arrangements can be optionally mechanically and slidably engaged to the block engagement arrangement. The rotation of the drive screw optionally simultaneously causes one or more of I) movement of the linkage block relative to the drive block, II) movement of the first endplate relative to the second endplate, and III) the first and/or second endplate engagement arrangements sliding relative to the block engagement arrangement. The engagement of the first and/or second endplate engagement arrangements with the block engagement arrangement optionally at least partially guides movement of the first endplate and/or the second endplate relative to at least one of the drive block or linkage block during rotation of the drive screw.

In another non-limiting embodiment, the expandable interbody device optionally includes one or more graft windows.

In another non-limiting embodiment, the expandable interbody device optionally includes first and/or second endplates that include first and/or second extensions. The optional first and second extensions on the first and/or second endplates can be configured to slidably engage one another when the expandable interbody device moves between the fully opened and fully closed positions.

In another non-limiting embodiment, the expandable interbody device optionally includes first and/or second endplates that include a micro-textured surface and/or one or more teeth.

In another non-limiting embodiment, the expandable interbody device optionally includes first and/or second endplates that include planar top surfaces that do not lie within the same plane. In one non-limiting arrangement, the plane of the top surface of the front portion of the first and/or second endplates is generally parallel (e.g., ±5° and all values and ranges therebetween) to the central axis of the linkage block when the expandable interbody device is in the fully open position.

In another non-limiting embodiment, the expandable interbody device is optionally configured such that the front and rear ends of the first and second endplates do not contact one another as the expandable interbody device moves from the fully open to the fully closed position.

In another non-limiting embodiment, the expandable interbody device is optionally configured such that two or more of the linkages are rotatably coupled to the linkage block along the same rotation axis.

In another non-limiting embodiment, the expandable interbody device is optionally configured such that one or more of the linkages is located closer to linkage block that one or more other of the linkages.

In another non-limiting embodiment, the expandable interbody device is optionally configured such that the drive block includes an engagement member that slidably engages the first and/or second end plates to prevent over expansion of the expandable interbody device.

In another non-limiting embodiment, the expandable interbody device is optionally configured such that the endplates of the expandable interbody device can optionally be partially or fully formed of titanium alloy. The drive block, pins, linkage block, drive screw, and/or linkages can optionally be partially or fully formed of a molybdenum alloy, rhenium alloy, or molybdenum-rhenium alloy (MoRe) alloy. As can be appreciated, the metal used to form the expandable interbody device can be the same metal material.

In one non-limiting object of the disclosure, there is provided an expandable interbody device that can be used as a prosthesis used during spinal surgery.

In another non-limiting embodiment of the disclosure, there is provided an expandable interbody device that is configured to be inserted into the space between spinal disks to provide stability. The expandable interbody device can be introduced between vertebrae of a patient's spine (e.g., in the disk space between adjacent vertebrae) for fixation with bone to immobilize the joint as part of a surgical treatment.

In another non-limiting embodiment of the disclosure, there is provided an expandable interbody device that includes a drive block, wherein the drive block optionally at least partially includes a drive block opening, a linkage block wherein the linkage block optionally at least partially including a linkage block opening; optionally a block engagement arrangement, a drive screw wherein the drive screw is optionally rotatably coupled within one of the drive block opening or the linkage block opening, and wherein the drive screw is optionally threadingly disposed within the other of the linkage block opening or the drive block opening, a first endplate wherein the first endplate optionally includes a first endplate engagement arrangement, a second endplate wherein the second endplate optionally includes a second endplate engagement arrangement, at least two linkages, and wherein at least one linkage rotatably couples the linkage block or the drive black to the first endplate and at least one other linkage rotatably couples the linkage block or the drive black to the second endplate.

In another non-limiting embodiment of the disclosure, there is provided an expandable interbody device wherein the first and second endplate engagement arrangements are optionally mechanically and slidably engaged to the block engagement arrangement. Rotation of the drive screw causes one or more of I) movement of the linkage block relative to the drive block, II) movement of the first endplate relative to the second endplate, and III) the first and/or second endplate engagement arrangements sliding relative to the block engagement arrangement.

In another non-limiting embodiment of the disclosure, there is provided an expandable interbody device wherein engagement of the first and/or second endplate engagement arrangements with the block engagement arrangement at least partially guides movement of the first endplate and/or the second endplate relative to at least one of the drive block or linkage block during rotation of the drive screw.

In another non-limiting embodiment of the disclosure, there is provided an expandable interbody device wherein the block engagement arrangement is optionally at least partially positioned on said drive block.

In another non-limiting embodiment of the disclosure, there is provided an expandable interbody device wherein the drive screw is optionally rotatably coupled within the drive block opening and threadingly disposed within the linkage block opening.

In another non-limiting embodiment of the disclosure, there is provided an expandable interbody device wherein the drive screw is optionally rotatably coupled within the drive block opening and threadingly disposed within the linkage block opening.

In another non-limiting embodiment of the disclosure, there is provided an expandable interbody device wherein the block engagement arrangement optionally includes at least one of a slot, protrusion, rib, rail, or groove.

In another non-limiting embodiment of the disclosure, there is provided an expandable interbody device wherein the first endplate engagement arrangement optionally includes at least one of a slot, protrusion, rib, rail, or groove.

In another non-limiting embodiment of the disclosure, there is provided an expandable interbody device wherein the second endplate engagement arrangement optionally includes at least one of a slot, protrusion, rib, rail, or groove.

In another non-limiting embodiment of the disclosure, there is provided an expandable interbody device wherein the first endplate engagement arrangement optionally includes alpha and beta first endplate engagement members, the block engagement arrangement optionally includes alpha and beta block engagement members, and wherein the alpha first endplate engagement member is optionally slidably engageable with the alpha block engagement member and/or the beta first endplate engagement member is optionally slidably engageable with said beta block engagement member.

In another non-limiting embodiment of the disclosure, there is provided an expandable interbody device, wherein the first endplate engagement arrangement optionally includes alpha and beta first endplate engagement members, the second endplate engagement arrangement optionally includes alpha and beta second endplate engagement members, the block engagement arrangement optionally includes alpha, beta, delta, and gamma block engagement members, and wherein A) the alpha first endplate engagement member is optionally slidably engageable with the alpha block engagement member, B) the beta first endplate engagement member is optionally slidably engageable with the beta block engagement member, C) the alpha second endplate engagement member is optionally slidably engageable with the delta block engagement member, and/or D) the beta second endplate engagement member is optionally slidably engageable with the gamma block engagement member.

In another non-limiting embodiment of the disclosure, there is provided an expandable interbody device wherein a lordosis of the expandable interbody device is about 6° in a fully closed position and the lordosis of the expandable interbody device is about 24° in a fully open position.

In another non-limiting embodiment of the disclosure, there is provided an expandable interbody device wherein the lordosis of the expandable interbody device is optionally about 10° at about 10% in a fully open position.

In another non-limiting embodiment of the disclosure, there is provided an expandable interbody device wherein the lordosis of the expandable interbody device is optionally about 15° at about 30% in a fully open position.

In another non-limiting embodiment of the disclosure, there is provided an expandable interbody device wherein a lordosis of the expandable interbody device is about optionally 20° at about 60% in a fully open position.

In another non-limiting embodiment of the disclosure, there is provided an expandable interbody device wherein the drive block, the first endplate, and/or the second endplate each optionally define a respective graft window, wherein two or more of the respective graft windows of the drive block, the first endplate, and the second endplate are optionally aligned with each other.

In another non-limiting embodiment of the disclosure, there is provided an expandable interbody device wherein each linkage optionally has a first portion and a second portion spaced apart from the first portion along a longitudinal axis, wherein the first portion of each of the linkages is optionally rotatably coupled to the linkage block and the second portion of each of the linkages is optionally rotatably coupled to either the first or second endplate.

In another non-limiting embodiment of the disclosure, there is provided an expandable interbody device wherein one of the drive block and the first endplate optionally defines a first slot and the other of the first endplate and the drive block optionally includes a first limit protrusion slidingly engaging the first slot to prevent over expansion of the first endplate relative to the drive block.

In another non-limiting embodiment of the disclosure, there is provided an expandable interbody device wherein one of the drive block and the second endplate optionally defines a second slot and the other of the second endplate and the drive block optionally includes a second limit protrusion slidingly engaged within the second slot to prevent over expansion of the second endplate relative to the drive block.

In another non-limiting embodiment of the disclosure, there is provided an expandable interbody device wherein the drive screw optionally extends only partially through the drive block opening.

In another non-limiting embodiment of the disclosure, there is provided an expandable interbody device wherein at least a portion of the expandable interbody device optionally includes one or more metals selected from the group consisting of titanium, chromium, molybdenum, rhenium, niobium, tantalum and zirconium.

In another non-limiting embodiment of the disclosure, there is provided an expandable interbody device wherein one or more of the first endplate and the second endplate optionally includes a micro-textured surface.

In another non-limiting embodiment of the disclosure, there is provided an expandable interbody device wherein one or more of the first endplate and the second endplate optionally includes one or more teeth.

In another non-limiting embodiment of the disclosure, there is provided a method for using an expandable interbody device comprising a) providing said expandable interbody device, b) inserting the expandable interbody device into a patient, and c) causing the drive screw to rotate which results in A) movement of the linkage block relative to the drive block, B) movement of the first endplate relative to the second endplate, and/or C) at least one of the first and second endplate engagement arrangements sliding relative to the block engagement arrangement.

Other objects, advantages, and novel features of the present invention will become apparent from the following detailed description of the invention when considered in conjunction with the accompanying drawings.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION OF NON-LIMITING EMBODIMENTS

Figure 1A:
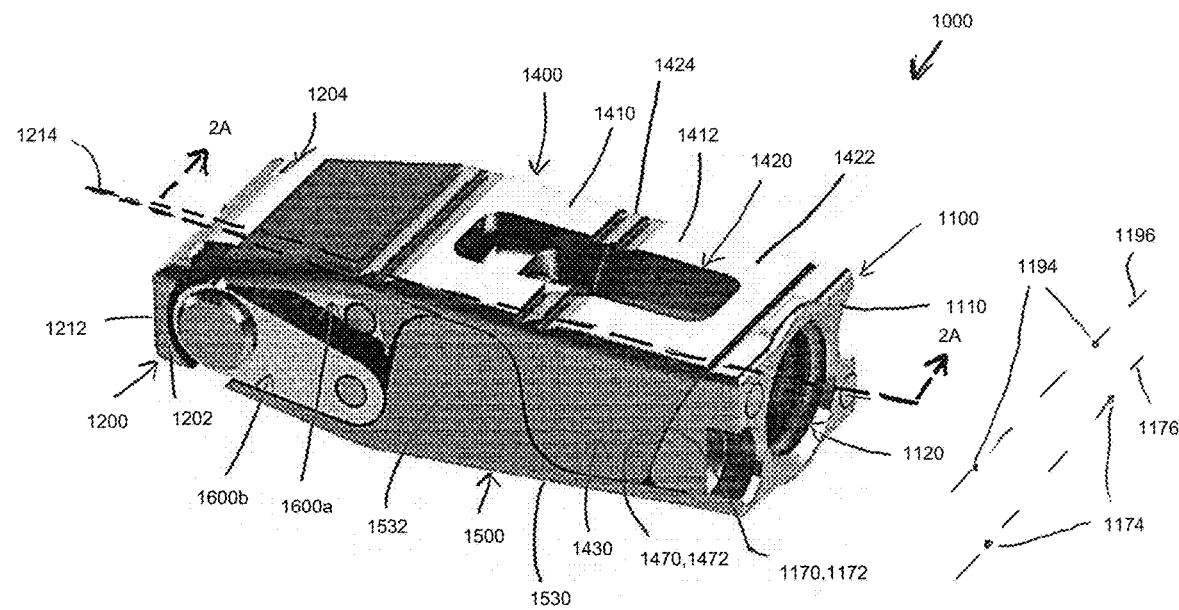
FIG. 1A is a perspective view of an expandable interbody device in a closed position, according to one implementation.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

The devices, systems, and methods described herein include an expandable interbody device. The device includes linkages and sets of curved ramps that allow for simultaneous movement of the endplates relative to each other along specific paths to achieve a desired height and lordosis.

Various implementations include an expandable interbody device. The device includes a drive block, a set of at least two first ramps, a set of at least two second ramps, a linkage block, a drive screw, a first endplate, a second endplate, and at least two linkages. The drive block defines a drive block opening, and the linkage block defines a linkage block opening. The drive screw is rotatably coupled within one of the drive block opening or linkage block opening and is threadingly disposed within the other of the linkage block opening or the drive block opening. The first endplate includes the set of at least two second ramps slidingly engaging the set of at least two first ramps. At least one linkage rotatably couples the linkage block to the first endplate, and at least one other linkage rotatably couples the linkage block to the second endplate. Rotation of the drive screw simultaneously causes movement of the linkage block relative to the drive block and movement of the first endplate relative to the second endplate.

FIGS. 1A-7C illustrate an expandable interbody device 1000, according to one non-limiting embodiment of the disclosure. FIG. 1A illustrates the device 1000 in a fully closed position, and FIG. 1B illustrates the expandable interbody device 1000 in a fully open position. The expandable interbody device 1000 includes a drive block 1100, a linkage block 1200, a drive screw 1300, a first endplate 1400, a second endplate 1500, and four linkages 1600 a, b, c, d.

The drive block 1100 includes a first side 1102, a second side 1104 opposite and spaced apart from the first side 1102, a third side 1106 extending between the first side 1102 and the second side 1104, a fourth side 1108 opposite and spaced apart from the third side 1106, a first end 1110 extending between the first side 1102 and the second side 1104, and second end 1112 opposite and spaced apart from the first end 1110. The first end 1110 of the drive block 1100 defines a drive block opening 1120 that extends from the first end 1110 to the second end 1112, and optionally along a central axis of the drive block.

Figure 2A:
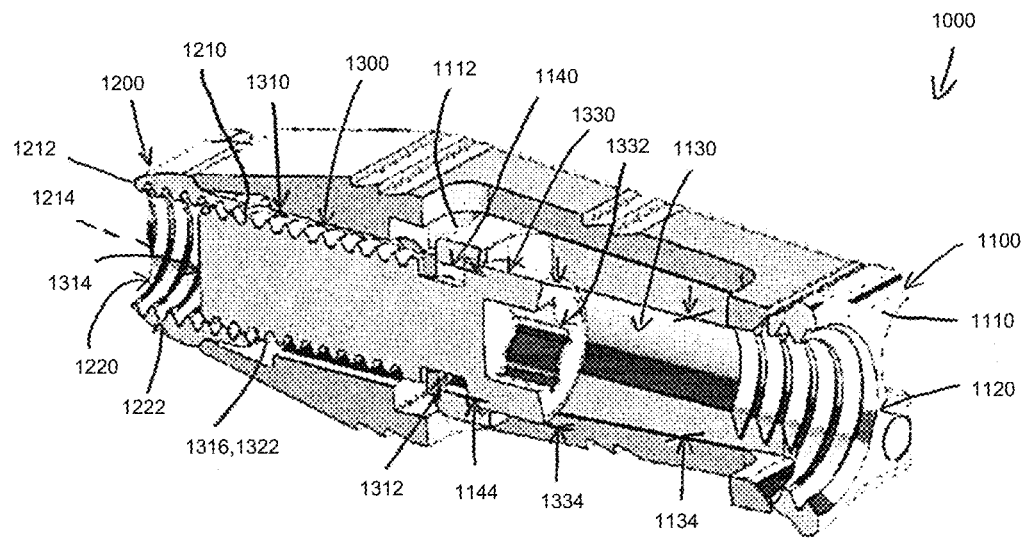
FIG. 2A is a cross-sectional view of the expandable interbody device of FIG. 1A along line 2A-2A in the closed position.
Figure 2B:
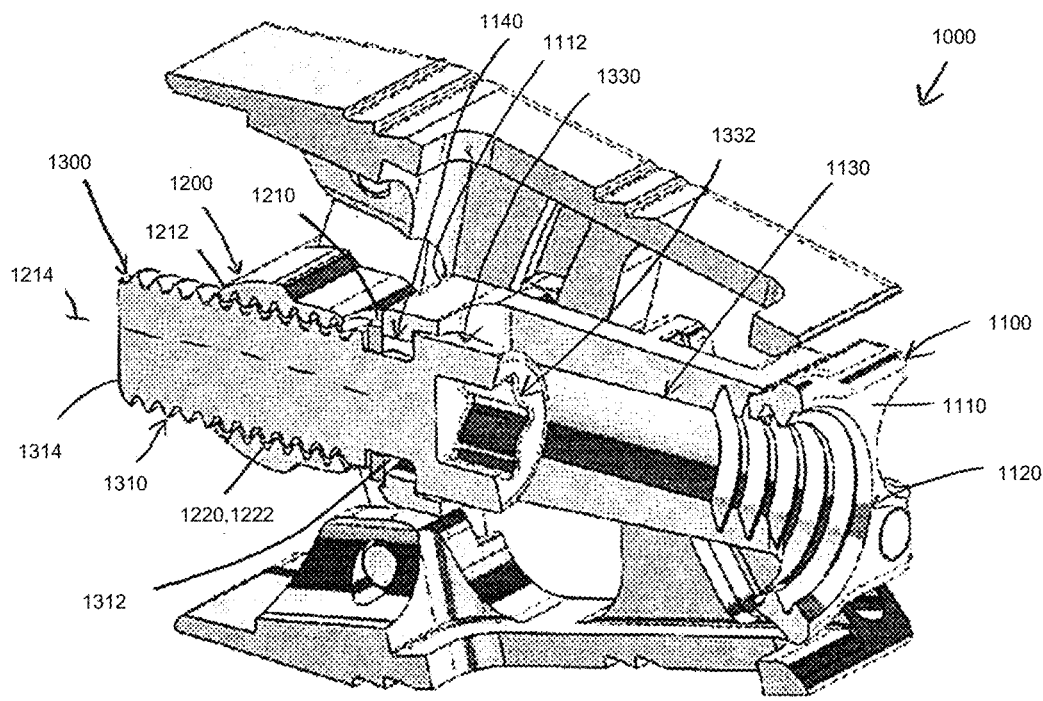
FIG. 2B is a cross-sectional view of the expandable interbody device of FIG. 1A along line 2B-2B in the open position.
Figure 3A:
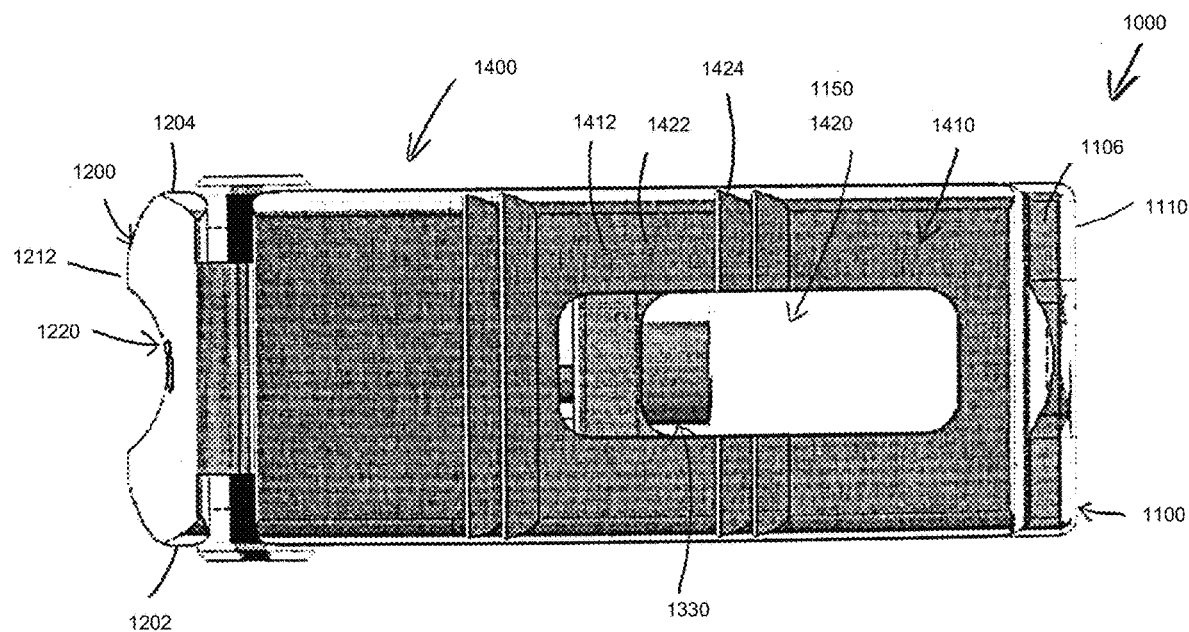
FIG. 3A is a top view of the expandable interbody device of FIG. 1A in the closed position.
Figure 3B:
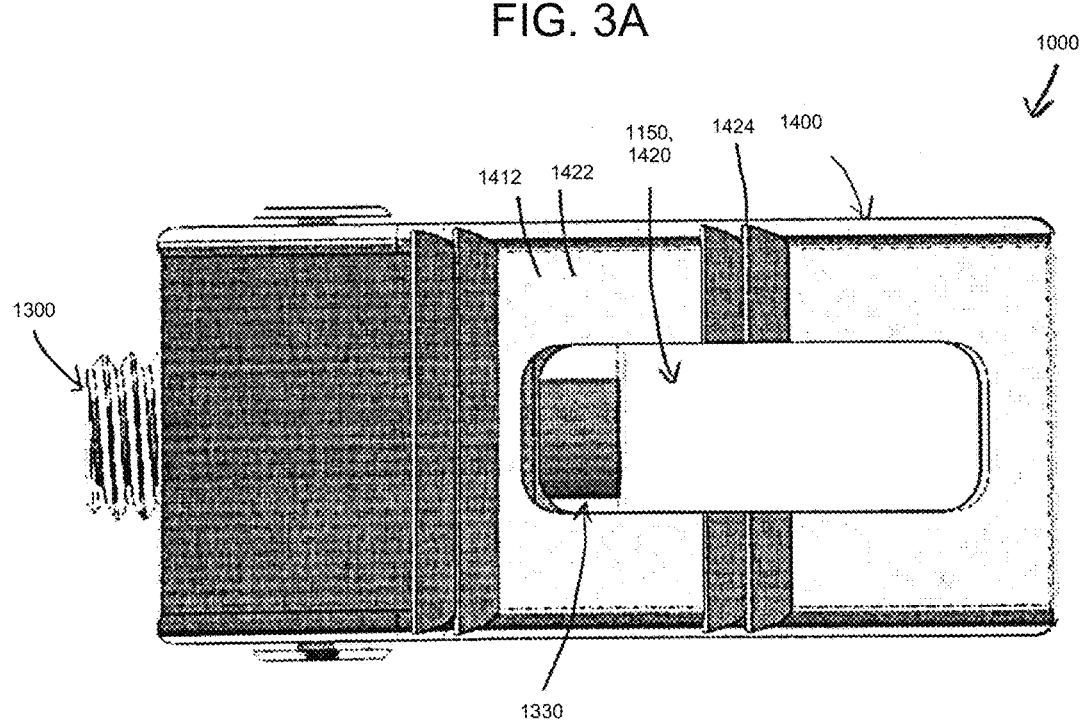
FIG. 3B is a top view of the expandable interbody device of FIG. 1A in the open position.

As illustrated in FIGS. 2A and 2B, the drive block opening 1120 has a first portion 1130 adjacent the first end 1110 and a second portion 1140 adjacent the second end 1112. The first portion 1130 has a first diameter 1134, and the second portion 1140 has a second diameter 1144. The second diameter 1144 is optionally less than the first diameter 1134.

The third side 1106 of the drive block 1100 optionally defines a graft window 1150 that extends at least partially from the third side 1106 to the fourth side 1108.

The first and second sides 1102, 1104 of the drive block 1100 include block engagement arrangements 1160. The first set of block engagement arrangement 1160 includes a first block engagement member 1162 extending from the second side 1104 of the drive block 1100 and a second block engagement member 1166 and a guide block engagement member 1170 extending from the first side 1102 of the drive block 1100. Each of the block engagement members 1162, 1166, 1170 of the first set of block engagement members are illustrated as protrusions from the side of the drive block 1100; however, it can be appreciated that one or more of the block engagement members can includes a recess region in the side of the drive block 1100. The block engagement members 1162, 1166, 1170 are illustrated as including one or more curved surfaces 1164, 1168, 1172, respectively. The shape of the block engagement members 1162, 1166, 1170 is selected to facilitate in the movement of the first and second endplates 1400, 1500 between the fully open and fully closed position.

The first and second sides 1102, 1104 of the drive block 1100 also include a second set of block engagement arrangements 1180. The second set of block engagement arrangements 1180 includes a first block engagement member 1182 extending from the first side 1102 of the drive block 1100 and a second block engagement member 1186 and a guide block engagement member 1190 extending from the second side 1104 of the drive block 1100. Each of the block engagement members 1182, 1186, 1190 of the second set of first ramps 1180 are illustrated as protrusions from the side of the drive block 1100; however, it can be appreciated that one or more of the block engagement members can includes a recess region in the side of the drive block 1100. The block engagement members 1182, 1186, 1190 are illustrated as including one or more curved surfaces 1184, 1188, 1192, respectively. The shape of the block engagement members 1182, 1186, 1190 is selected to facilitate in the movement of the first and second endplates 1400, 1500 between the fully open and fully closed position.

The third side 1106 of the drive block 1100 illustrated in FIGS. 1A-7C can include a graft window 1150; however, in other embodiment the drive block 1100 is not required to define a graft window. Although the first and second sets of block engagement members 1160, 1180 include three block engagement members, the first and second sets of block engagement members 1160, 1180 can include any number of block engagement members (e.g., 1, 2, 3, 4, 5, 6 . . . ). The number of block engagement members included in the first and second sets of block engagement members 1160, 1180 can be the same or different.

The linkage block 1200 includes a first side 1202, a second side 1204 opposite and spaced apart from the first side 1202, a first end 1210 extending between the first side 1202 and the second side 1204, a second end 1212 opposite and spaced apart from the first end 1210, and a central axis 1214 extending perpendicular to the first and second ends 1210, 1212. The first end 1210 of the linkage block 1200 defines a linkage block opening 1220 that optionally extends along the central axis 1214 of the linkage block 1200 from the first end 1210 to the second end 1212. As illustrate in FIGS. 2A and 2B, the inner surface of the linkage block opening 1220 defines threads 1222; however, this is not required.

The drive screw 1300 includes a body 1310 and an engagement head 1330. The body 1310 includes a first end 1312, a second end 1314 opposite and spaced apart from the first end 1312, and an outer surface 1316 extending between the first end 1312 and the second end 1314. The outer surface 1316 of the drive screw 1300 optionally defines threads 1322 that are located on at least a portion of the outer surface 1316. The threads 1322 (when used) are sized to threadingly engage the threads 1222 in the linkage block opening 1220.

The engagement head 1330 of the drive screw 1300 is optionally coupled to the first end 1312 of the drive screw 1300 and optionally defines a Torx head driver opening 1332 that is engageable with a rotation tool. The engagement head 1330 has a diameter 1334 that is optionally larger than the second diameter 1144 of the second portion 1140 of the drive block opening 1120, but optionally smaller than the first diameter 1134 of the first portion 1130 of the drive block opening 1120. The body 1310 of the drive screw 1300 has a diameter that is optionally smaller than the second diameter 1144 of the second portion 1140 of the drive block opening 1120. As can be appreciated, the shape of the screw is non-limiting.

The drive screw 1300 extends through the linkage block opening 1220 and partially through the drive block opening 1120 such that the drive screw 1300 extends between the second end 1112 of the drive block 1100 and the first end 1210 of the linkage block 1200. The threads 1322 of the drive screw 1300 (when used) threadingly engage the threads 1222 of the linkage block opening 1220. Because the diameter 1334 of the engagement head 1330 of the drive screw 1300 has a larger diameter 1334 than the second diameter 1144 of the second portion 1140 of the drive block opening 1120, the engagement head 1330 is retained in the first portion 1130 of the drive block opening 1120 and cannot pass through the second portion 1140 of the drive block opening 1120. As can be appreciated, other or additional arrangement can be used to prevent the engagement head 1330 from passing through the second portion 1140 of the drive block opening 1120.

Because the diameter of the body 1310 of the drive screw 1300 is smaller than the second diameter 1144 of the second portion 1140 of the drive block opening 1120, the drive screw 1300 is freely rotatably coupled within the second portion 1140 of the drive block opening 1120. When the drive screw 1300 is rotated, the engaged threads 1222, 1322 of the drive screw 1300 and linkage block opening 1220 cause the drive screw 1300 to move toward or away from the second end 1212 of the linkage block 1200, which causes the drive block 1100 to move relative to the linkage block 1200. As can be appreciated, other arrangement can be used to cause the drive block 1100 to move relative to the linkage block 1200 when the drive screw is rotated.

Although the drive block opening 1120 illustrated in FIGS. 1A-7C include the first portion 1130 and second portion 1140 and the linkage block opening 1220 defines threads 1222, in other implementations, the drive block opening 1120 optionally defines threads 1222 and the linkage block opening 1220 optionally includes the first portion and second portion. The driver opening 1332 of the engagement head 1330 illustrated in FIGS. 1A-7C is a Torx head, but in other implementations, the driver opening 1332 of the engagement head 1330 is a hex socket head, a square head, a slotted head, a Phillips head, a hex head, a Robertson head or any other standard size such that the engagement head 1330 is engageable by a standard sized bit of a rotation tool to rotate the drive screw 1300 relative to the drive block and linkage block 1200.

Each of the first endplate 1400 and the second endplate 1500 include a body 1410, 1510, optionally a first extension 1430, 1530, and optionally a second extension 1432, 1532. The body 1410, 1510 has a first side 1412, 1512 and a second side 1414, 1514 opposite and spaced apart from the first side 1412, 1512. The second side 1414 of the first endplate 1400 is disposed adjacent the third side 1106 of the drive block 1100, and the second side 1514 of the second endplate 1500 is disposed adjacent the fourth side 1108 of the drive block 1100.

The first sides 1412, 1512 of the first and second endplates 1400, 1500 each optionally define a graft window 1420, 1520 extending from the first side 1412, 1512 of the endplate to the second side 1414, 1514 of the respective endplate. The respective graft windows 1150, 1420, 1520 of the drive block, the first endplate 1400, and the second endplate 1500 are optionally aligned with each other. The graft windows can optionally be used to facilitate bone growth once the expandable interbody device is inserted in a patient.

The first sides 1412, 1512 of each of the first and second endplates 1400, 1500 can optionally include a micro-textured surface 1422, 1522 and/or one or more teeth 1422, 1522 to create friction between the bone and the endplates. However, in other implementations, the first sides 1412, 1512 of each of the first and second endplates 1400, 1500 include any number of teeth, no teeth, and/or no micro-textured surface 1422, 1522.

The first and second endplates 1400, 1500 can include planar top surfaces that do not lie within the same plane. As illustrated in FIGS. 1-2, the first and second endplates 1400, 1500 both include a front portion and a rear portion when the top surface of these two portions do not lie in the same plane.

Figure 1B:
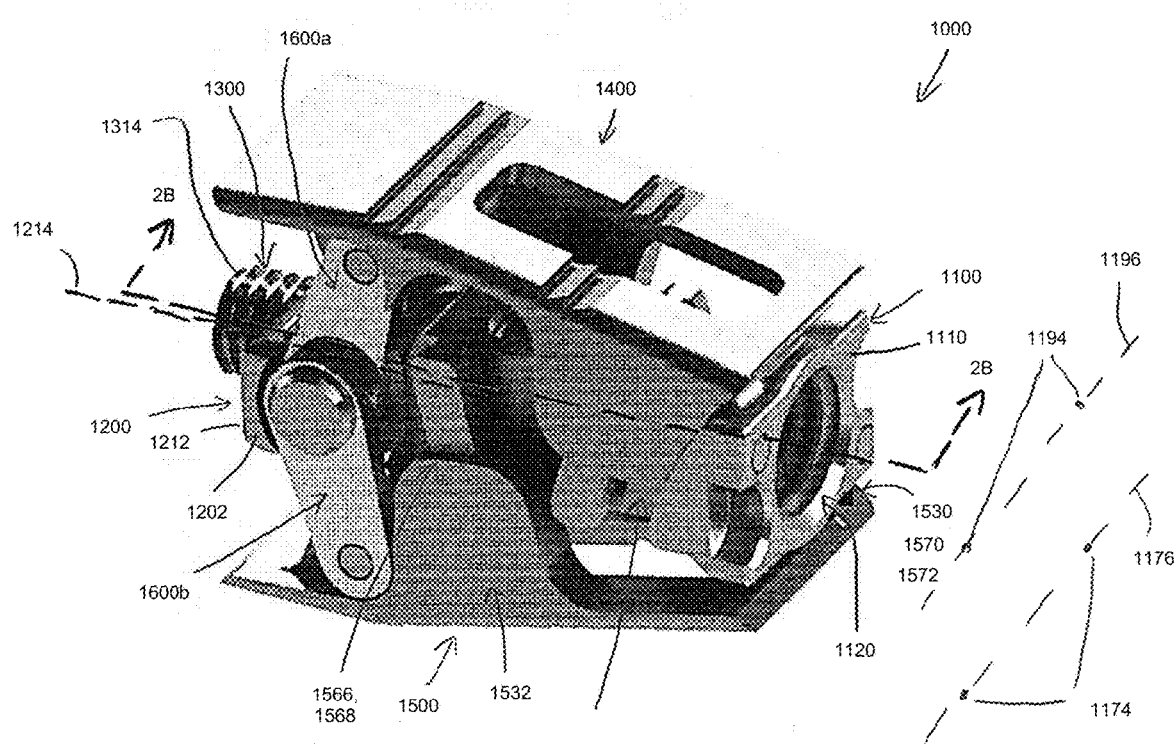
FIG. 1B is a perspective view of the expandable interbody device of FIG. 1A in an open position.

The front portion of the first endplate 1400 slopes downwardly from the rear portion at an angle of about 5-30° (and all values and ranges therebetween). The top surface of the front portion of the first endplate 1400 has a generally planar or flat surface along 50-100% (and all values and ranges therebetween) of the longitudinal length of the front portion. The longitudinal length of the front portion is generally less than the longitudinal length of the rear portion. Generally, the longitudinal length of the front portion is 20-80% (and all values and ranges therebetween) of the longitudinal length of the rear portion, and typically 30-50% of the longitudinal length of the rear portion. As illustrated in FIG. 1B, the plane of the top surface of the front portion of the first endplate 1400 is generally parallel (e.g., ±5° and all values and ranges therebetween) to the central axis 1214 of the linkage block 1200 when the expandable interbody device 1000 is in the fully open position, and the plane of the top surface of the rear portion of the first endplate 1400 is not parallel to the central axis 1214 of the linkage block 1200 when the expandable interbody device 1000 is in the fully open position.

The front portion of the second endplate 1500 slopes upwardly from the rear portion at an angle of about 5-30° (and all values and ranges therebetween). The top surface of the front portion of the second endplate 1500 has a generally planar or flat surface along 50-100% (and all values and ranges therebetween) of the longitudinal length of the front portion. The longitudinal length of the front portion is generally less than the longitudinal length of the rear portion. Generally, the longitudinal length of the front portion is 20-80% (and all values and ranges therebetween) of the longitudinal length of the rear portion, and typically 30-50% of the longitudinal length of the rear portion. As illustrated in FIG. 1B, the plane of the top surface of the front portion of the second endplate 1500 is generally parallel (e.g., ±5° and all values and ranges therebetween) to the central axis 1214 of the linkage block 1200 when the expandable interbody device 1000 is in the fully open position, and the plane of the top surface of the rear portion of the second endplate 1500 is not parallel to the central axis 1214 of the linkage block 1200 when the expandable interbody device 1000 is in the fully open position.

Figure 4A:
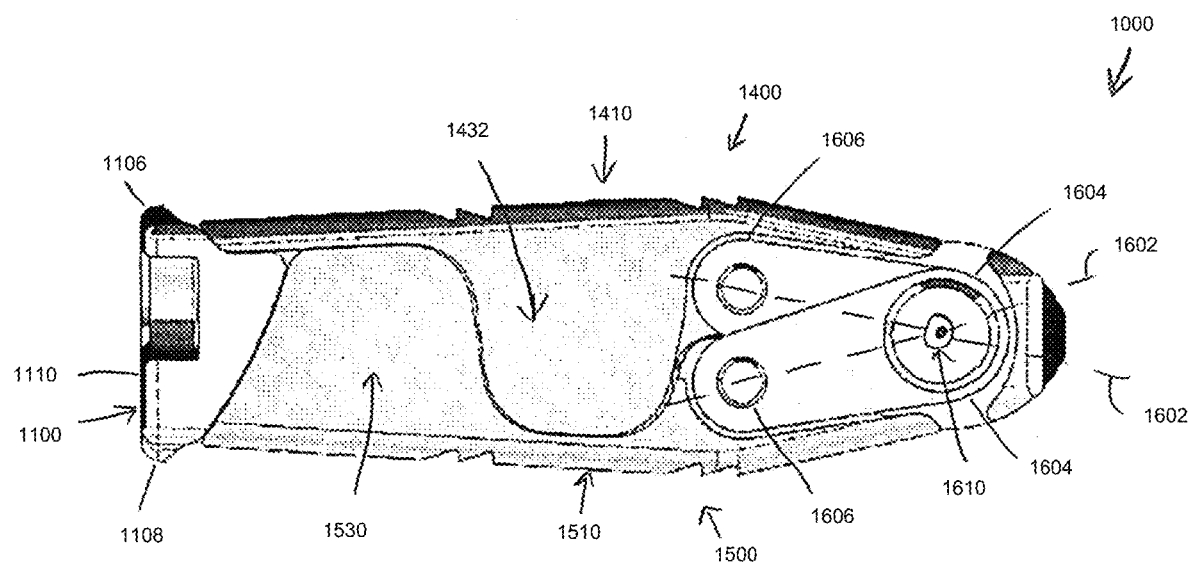
FIG. 4A is a side view of the expandable interbody device of FIG. 1A in the closed position.
Figure 4B:
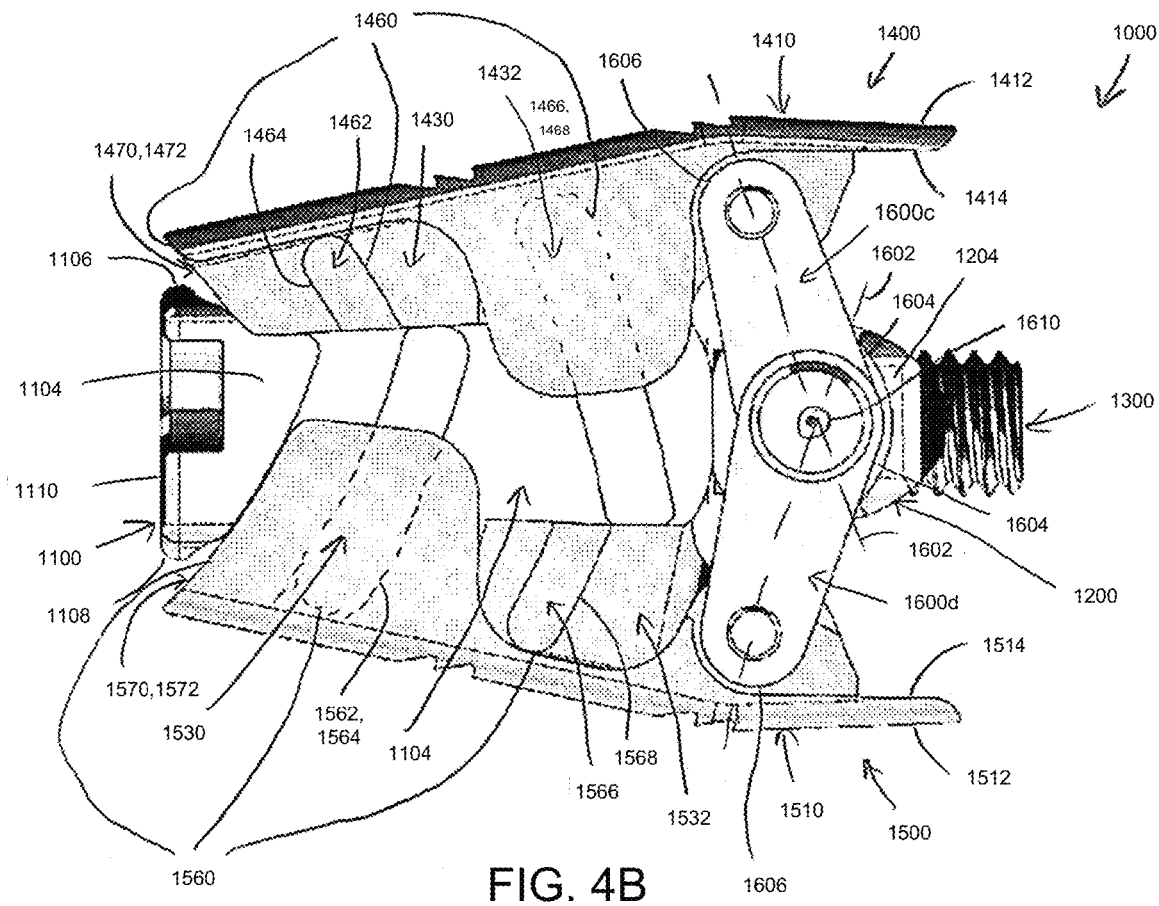
FIG. 4B is a side view of the expandable interbody device of FIG. 1A in the open position.
Figure 5A:
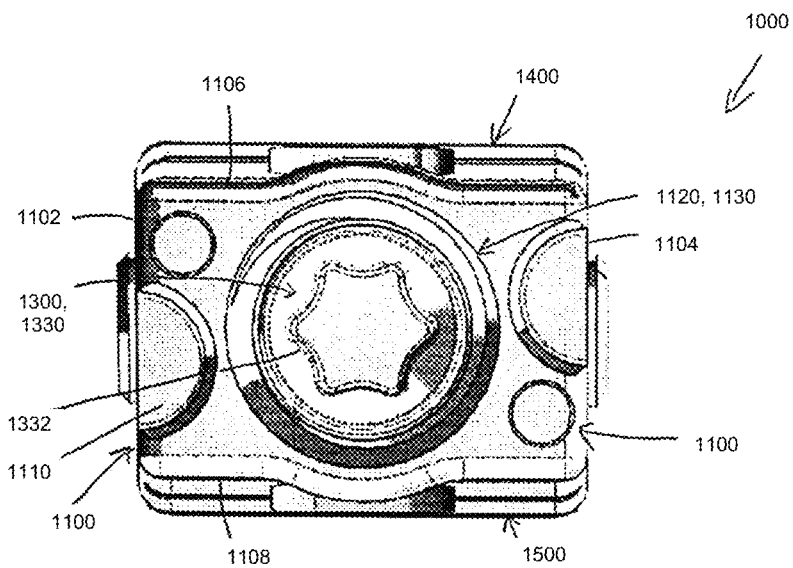
FIG. 5A is a first end view of the expandable interbody device of FIG. 1A in the closed position.
Figure 5B:
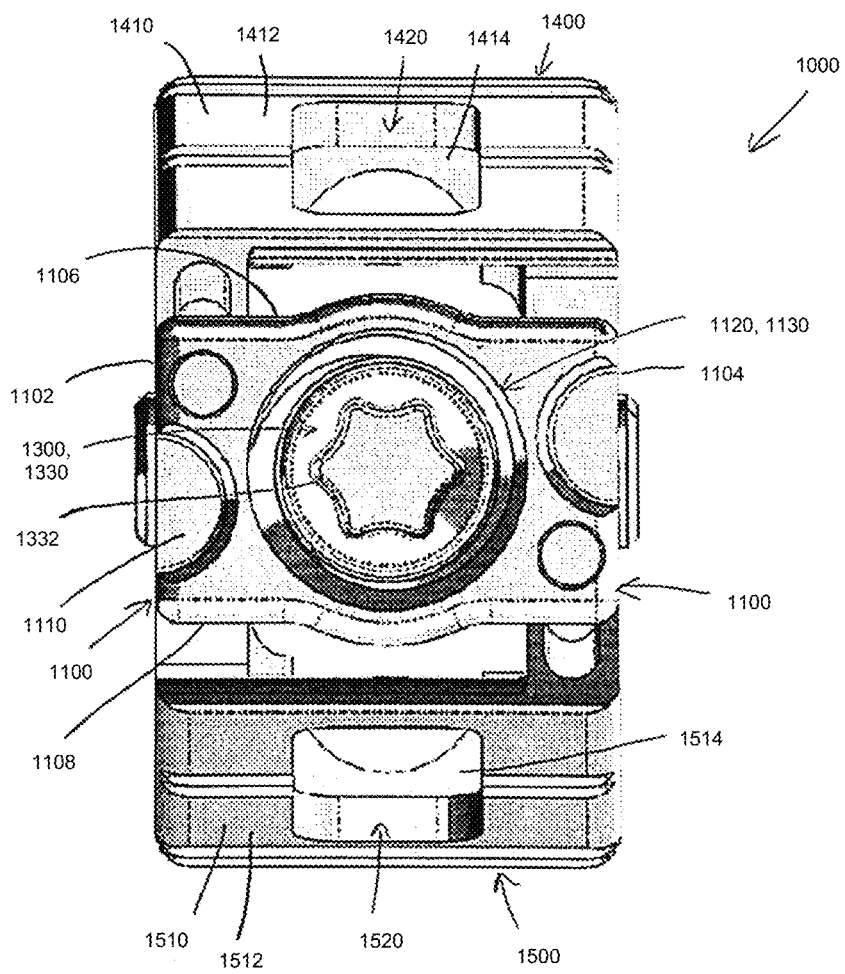
FIG. 5B is a first end view of the expandable interbody device of FIG. 1A in the open position.
Figure 6A:
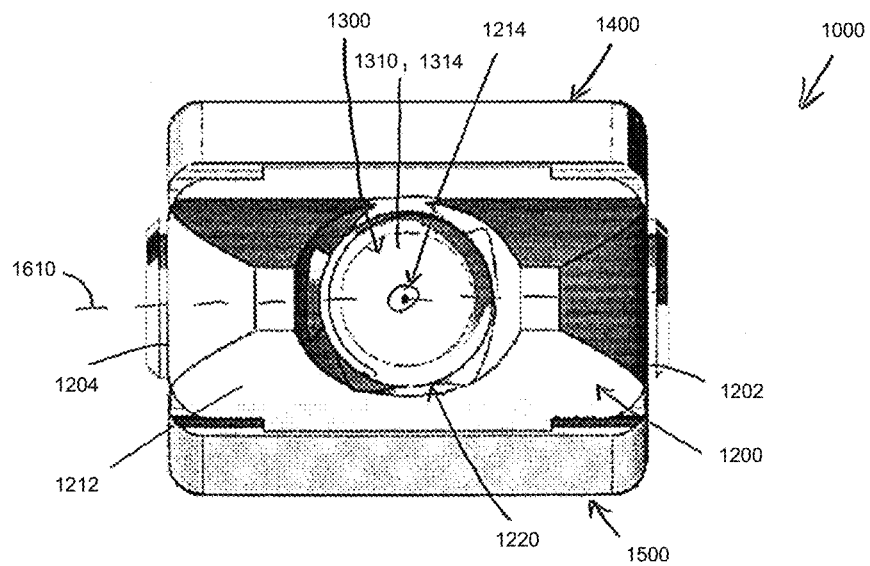
FIG. 6A is a second end view of the expandable interbody device of FIG. 1A in the closed position.
Figure 6B:
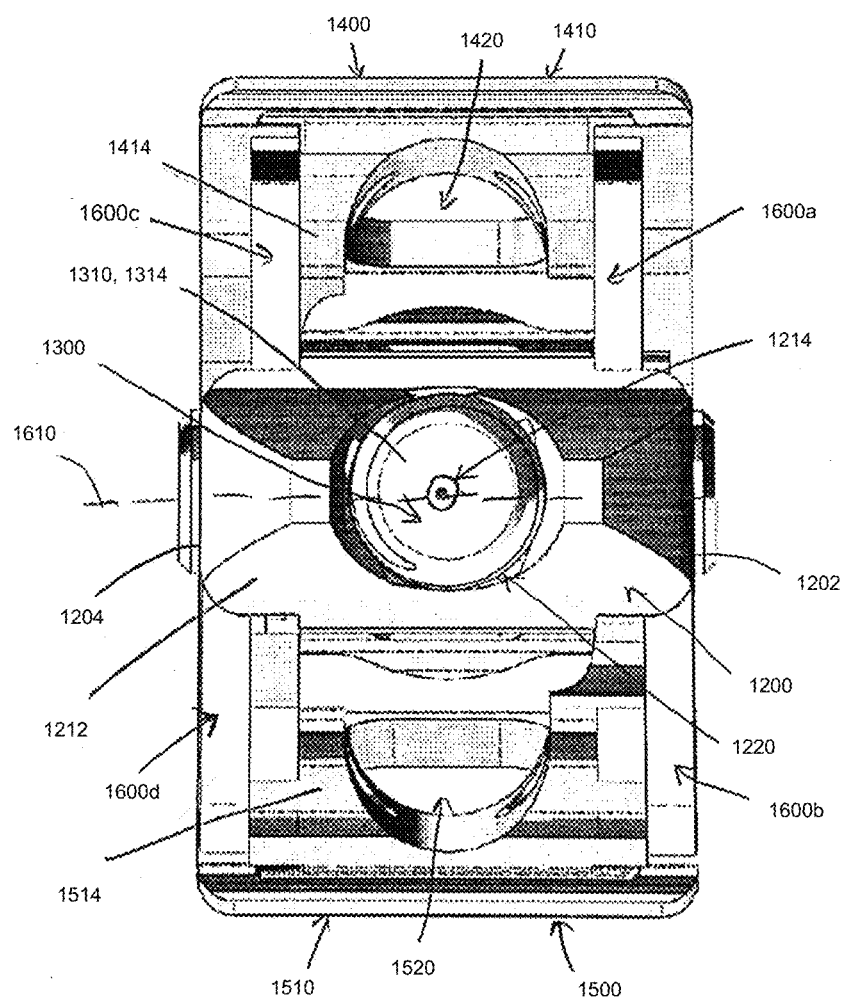
FIG. 6B is a second end view of the expandable interbody device of FIG. 1A in the open position.

As illustrated in FIG. 4, the front and rear ends of the first and second endplates 1400, 1500 can be configured to not contact one another as the expandable interbody device 1000 moves from the fully open to the fully closed position.

The first extension 1430, 1530 extends from one edge of the second side 1414, 1514 of the body 1410, 1510, and the second extension 1432, 1532 extends from the opposite edge of the second side 1414, 1514 of the body 1410, 1510 in a direction parallel to the first extension 1430, 1530.

The optional first and second extensions 1430, 1432 of the first endplate 1400 include a first set of endplate engagement members 1460. The inner surface of the first extension 1430 of the first endplate 1400 can optionally include a first endplate engagement member 1462 and a first endplate guide engagement member 1470, and the inner surface of the second extension 1432 of the first endplate 1400 can optionally include another endplate engagement member (not shown). The first endplate engagement member can include a groove, protrusion, slot, ramp surface, etc. The first endplate guide engagement members can include a groove, protrusion, slot, ramp surface, etc. As illustrated in FIGS. 2 and 4, the first endplate engagement members are a groove or slot and the first endplate guide engagement members are a ramped surface. The first endplate guide engagement members and/or the first endplate guide engagement members can include one or more curved surfaces 1464, 1468, 1472. Generally, the size and curvature of the first endplate guide engagement members and/or the first endplate guide engagement members is selected at least closely matches the size and/or curvature of a complimentary guide engagement member 1160 such that they are slidingly engageable with one another. The first endplate guide engagement member 1470 of the first set of endplate engagement members 1460 is defined by an edge of the first extension 1430 of the first endplate 1400. The first endplate guide engagement member 1470 has a size and curvature that matches the size and curvature of the engagement member 1170 such that the engagement members are slidingly engageable with one another. As illustrated in FIGS. 2 and 4, guide block engagement member 1170 abuts against the guide engagement member 1470.

The first and second extensions 1530, 1532 of the second endplate 1500 include a second set of endplate guide engagement members 1560. The inner surface of the first extension 1530 of the second endplate 1500 defines a first engagement member 1562 (e.g., groove, slot, protrusion, ramp, etc.) and a guide engagement member 1570 (e.g., groove, slot, protrusion, ramp etc.), and the inner surface of the second extension 1532 of the second endplate 1500 defines a second engagement member 1562 (e.g., groove, slot, protrusion, ramp, etc.). Each of the engagement members of the second ramps of the second set of second ramps 1560 can optionally include one or more curved surface 1564, 1568, 1572 with a size and curvature that matches the size and curvature of a complimentary engagement members 1180 such that the engagement members 1180 are slidingly engaged with the engagement members 1560. The engagement member 1570 is defined by an edge of the first extension 1530 of the second endplate 1500. The engagement member 1570 has a size and curvature that at least closely matches the size and curvature of engagement member 1190 such that engagement members 1190 is slidingly abutted against engagement members 1570.

Although the first and second sets of second engagement members include three engagement members each, in other implementations, the first and second sets of second engagement members can include other number of engagement members (e.g., 1, 2, 3, 4, 5, 6). In some implementations, the first and second sets of second engagement members (ramps, grooves, slots, rails, etc.) correspond to the number of engagement members included in the first and second sets of engagement members 1160, 1180. In other implementations, the first and second extensions 1430, 1432, 1530, 1532 of the each of the first and second endplates 1400, 1500 can include any number of engagement members.

Although in FIGS. 1A-7C the drive block 1100 includes protrusions and the endplates include guide grooves, in other implementations, the drive block 1100 can include guide grooves and the endplates can include protrusions. In some implementations, the drive block can include any combination of guide protrusions and/or guide grooves, and the endplates can include a corresponding combination of slidingly engaging guide protrusions and/or guide grooves.

The curved surfaces 1164, 1168, 1172, 1184, 1188, 1192 of each curved engagement members of the first and second sets of first engagement members 1160, 1180 can have different radiuses of curvature to allow the first and second endplates 1400, 1500 to move away from the drive block 1100 along a desired path. However, to allow the smooth movement of the first and second endplates 1400, 1500 relative to the drive block 1100, the curved surfaces 1164, 1168, 1172 of one or more of the engagement members of the first set of first engagement members 1160 all include a center point 1174 that lies along a first engagement members axis 1176, and the curved surfaces 1184, 1188, 1192 of each engagement members of the second set of first engagement members 1180 all include a center point 1194 that lies along a second engagement members axis 1196. Thus, the curved surfaces of the engagement members of the first set of first engagement members 1160 are arcs of concentric circles, and the curved surfaces of the engagement members of the second set of first engagement members 1180 are arcs of concentric circles, engagement members.

The expandable interbody device 1000 illustrated in FIGS. 1A-7C includes a first linkage 1600a, a second linkage 1600b, a third linkage 1600c, and a fourth linkage 1600d. Each of the four linkages 1600a, 1600b, 1600c, 1600d has a longitudinal axis 1602, a first portion 1602, and a second portion 1604 spaced apart from the first portion 1602 along the longitudinal axis 1602. The first portions 1602 of the first and second linkages 1600a, 1600b are rotatably coupled to the first side 1202 of the linkage block 1200, and the first portions 1602 of the third and fourth linkages 1600c, 1600d are rotatably coupled to the second side 1204 of the linkage block 1200. In one non-limiting arrangement, as illustrated in FIG. 4, the first and second linkages 1600a, 1600b are rotatably coupled to the first side 1202 of the linkage block 1200 along the same rotation axis, and the third and fourth linkages 1600c, 1600d are rotatably coupled to the second side 1204 of the linkage block 1200 along the same rotation axis. In one non-limiting embodiment, the same rotation axis is shared by all four linkages when connected to the linkage block 1200. As illustrated in FIG. 4, at least a portion of the first and second linkages 1600a, 1600b overlie one another along the rotation axis of the linkages, and at least a portion of the third and fourth linkages 1600c, 1600d overlie one another along the rotation axis of the linkages. As illustrated in FIG. 4, linkage 1600c is located closer to linkage block 1200 than linkage 1600d. Likewise, linkage 1600a is located closer to linkage block 1200 than linkage 1600b.

The second portions 1604 of the first and third linkages 1600a, 1600c are rotatably coupled to the first endplate 1400, and the second portions 1604 of the second and fourth linkages 1600b, 1600d are rotatably coupled to the second endplate 1500. In one non-limiting arrangement, the first and second endplates do not engage the linkable block when the expandable interbody device 1000 is in the fully open position. In such an arrangement, the only connection between the first and second endplates and the linkable block is via the four linkages 1600a, 1600b, 1600c, 1600d. Also, in such arrangement, the linkable block is absent engagement members that slidably engage the first and second endplates. In another non-limiting embodiment, the first and second endplates remain in constant engagement with the drive block 1100 as the expandable interbody device 1000 moves between the fully open and fully closed positions. In another non-limiting embodiment, one or both of the first and second endplates are not rotatable connected to the drive block 1100 as the expandable interbody device 1000 moves between the fully open and fully closed positions. In one non-limiting arrangement one or both of the first and second endplates are only slidably engaged with the drive block 1100 as the expandable interbody device 1000 moves between the fully open and fully closed positions, and the only rotational connections are the four linkages 1600a, 1600b, 1600c, 1600d with the first and second endplates and the linkage block.

The first portions 1602 of each of the linkages 1600a, 1600b, 1600c, 1600d in FIGS. 1A-7C are rotatably coupled to the linkage block 1200 such that they are rotatable about a rotational axis 1610 that optionally intersects the central axis 1214 of the linkage block 1200 and is optionally parallel to the first and second sides 1202, 1204 of the linkage block 1200. In other implementations, the first portions of each of the linkages are rotatably coupled to any portion of the first and second sides of the linkage block. In the implementations illustrated in FIGS. 1A-7C, the first portions 1602 of each of the linkages 1600a, 1600b, 1600c, 1600d are rotatable about the same rotational axis 1610, but in other implementations, the first portions of the first and third linkages are rotatable about the same rotational axis, and the first portions of the second and fourth linkages are rotatable about a different rotational axis.

Figure 7A:
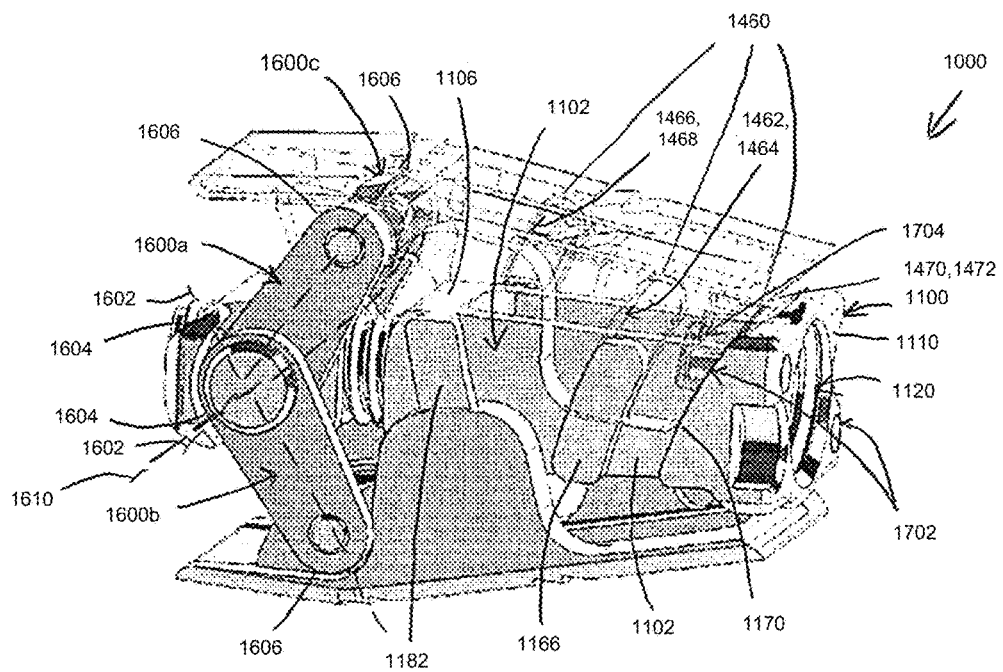
FIG. 7A is a perspective view of the expandable interbody device of FIG. 1A in the open position with the first endplate illustrated transparently.
Figure 7B:
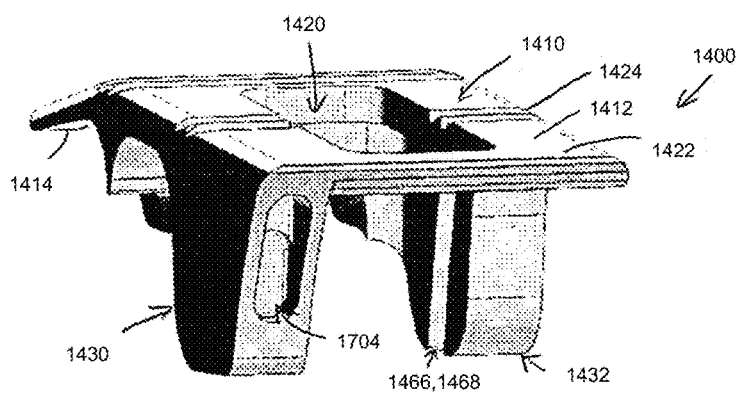
FIG. 7B is a perspective view of the first endplate of the expandable interbody device of FIG. 1A.
Figure 7C:
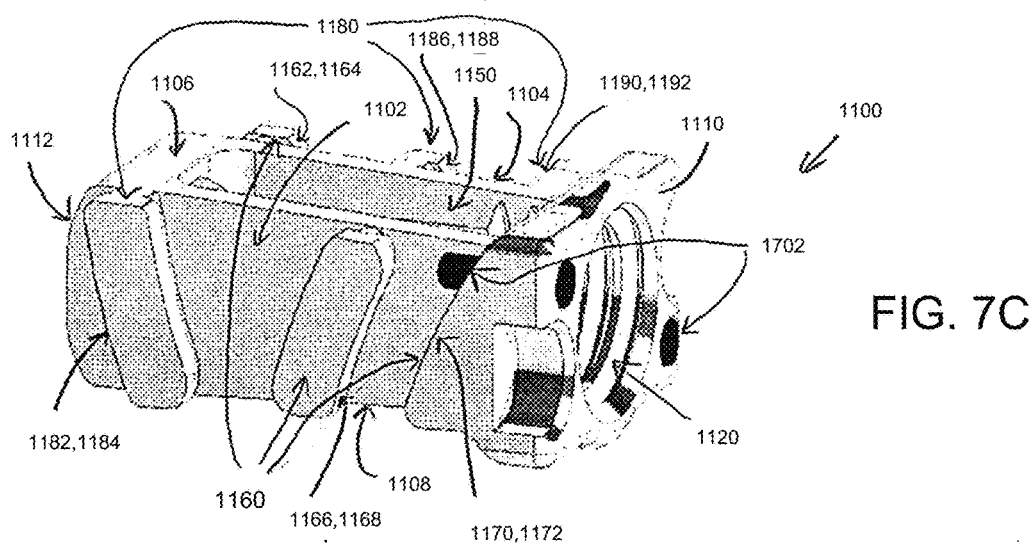
FIG. 7C is a perspective view of the drive block of the expandable interbody device of FIG. 1A.

As illustrate in FIGS. 7A-7C, each of the engagement members 1170, 1190 of the drive block 1100 each include a protrusion 1702 extending from their curved surfaces. Each of the guide engagement members 1470, 1570 of the first and second endplates 1400, 1500 include retaining slots 1704 defined by their curved surfaces. When the expandable interbody device 1000 is assembled, the protruding portions of each of the protrusion 1702 are disposed within one of the retaining slots 1704. The retaining slots 1704 are sized such that the protrusions 1702 can slide along a length of the slot but prevent over expansion of the first and second endplates 1400, 1500 relative to the drive block 1100.

Although FIGS. 7A-7C illustrate the drive block 1100 including the protrusions 1702 and the first and second endplates 1400, 1500 including the retaining slots 1704, in other implementations, the first and second endplates 1400, 1500 include the protrusions and the drive block 1100 includes the slots. In some implementations, only one of the first or second endplates includes either the protrusion or slot and the corresponding guide ramp 1170, 1190 of the drive block 1100 includes the other of the slot or protrusion. In some implementations, the expandable interbody device 1000 does not include protrusions or slots.

In use, the first and second endplates 1400, 1500 of the expandable interbody device 1000 begin at a minimum distance from each other (a minimum "height") in a closed position, as illustrated in FIGS. 1A and 2A. A rotation tool (not illustrated) is inserted into the driver opening 1332 of the engagement head 1330 to engage the drive screw 1300. The drive screw 1300 is rotated within the drive block opening 1120 and the linkage block opening 1220 to cause the linkage block 1200 to move toward the drive block 1100. During rotation of the drive screw 1300, the engagement head 1330 does not move axially along the longitudinal axis of the drive block while the linkable block moves relative to the drive block. In one non-limiting arrangement, a portion of the drive screw extends outwardly from the second end 1212 of the linkage block 1200 when the expandable interbody device 1000 is in the fully open position as illustrated in FIGS. 1B, 2B. In another non-limiting embodiment, a portion of the drive screw does not extend outwardly from the second end 1212 of the linkage block 1200 when the expandable interbody device 1000 is in the fully closed position as illustrated in FIGS. 1A, 2A, and can optionally be retracted from the second end 1212 of the linkage block 1200 when the expandable interbody device 1000 is in the fully closed position as illustrated in FIG. 2A. As illustrated in FIGS. 1-2, the drive screw moves along the longitudinal axis of the linkable block 1200 when the expandable interbody device 1000 moves between the fully open and closed positions.

As the linkage block 1200, and thus the rotational axis 1610 of the first portions 1602a, 1602b, 1602c, 1602d of the linkages 1600a, 1600b, 1600c, 1600d, move toward the drive block 1100, the relative angles of the longitudinal axes of each of the linkages 1600a, 1600b, 1600c, 1600d increase with respect to the central axis 1214 of the linkage block 1200. Because the second ends of the first and third linkages 1600, 1600 are rotatably coupled to the first endplate 1400 and the second ends of the second and fourth linkages 1600, 1600 are rotatably coupled to the second endplate 1500, the increasing relative angles of the longitudinal axes of the linkages 1600a, 1600b, 1600c, 1600d with respect to the central axis 1214 of the linkage block 1200 cause the first and second endplates 1400, 1500 to move away from each other until the expandable interbody device 1000 reaches a maximum height in an open position, as illustrated in FIGS. 1B and 2B. Thus, rotation of the drive screw 1300 can simultaneously cause movement of the linkage block 1200 relative to the drive block 1100 and movement of the first endplate 1400 relative to the second endplate 1500.

As the first and second endplates 1400, 1500 move away from each other and away from the drive block 1100, the curved surface(s) of each of the second engagement members slide along the complementary curved surface(s) of each of the corresponding first engagement members 1160, 1180. Because the curved surfaces of each of the first set of second engagement members and first engagement members have a center point 1174 along the first engagement members axis 1176 and the curved surfaces of each of the second set of second engagement members 1560 and first engagement members have a center point 1194 along the second engagement members axis 1196, the endplates 1400, 1500 rotate about the engagement members axes 1176, 1196. The curvature of the curved surfaces of the second engagement members and first engagement members is selected to cause a desired specific movement path of the endplates as the expandable interbody device 1000 moves from the fully closed position to the fully open position.

For example, due to the curvature of the first engagement members in FIGS. 1A-7C, the ends of the first engagement members in the first set of first engagement members 1160 adjacent the third side 1106 of the drive block 1100 are closer to the first end 1110 of the drive block 1100 than the ends of the first engagement members in the first set of first ramps 1160 adjacent the fourth side 1108 of the drive block 1100. Also, the ends of the first engagement members in the second set of first engagement members 1180 adjacent the fourth side 1108 of the drive block 1100 are closer to the first end 1110 of the drive block 1100 than the ends of the first engagement members in the second set of first engagement members 1180 adjacent the third side 1106 of the drive block 1100. Thus, the sliding engagement of the second engagement members and the first engagement members as the first and second endplates 1400, 1500 move away from each other also causes the first and second endplates 1400, 1500 to move toward the first end 1110 of the drive block 1100.

Also, because the first engagement members and the second engagement members slidingly engage each other along curved surfaces, the angle between the first sides 1412, 1512 of the first and second endplates 1400, 1500 increases as the expandable interbody device 1000 moves from the fully closed position to the fully open position. This angle between the first sides 1412, 1512 of the first and second endplates 1400, 1500 is also referred to as the lordosis of the expandable interbody device 1000.

The change in height, change in lordosis, and rate of change of lordosis of the device 1000 can be selected by modifying the expandable interbody device 1000 such that the first and second engagement members axes are in a different positions relative to the drive block 1100, since moving the engagement members axes alters the relative radii of curvature and angles of the first engagement members and second engagement members. In the implementation illustrated in FIGS. 1A-7C, the height of the expandable interbody device 1000 as measured between the edges of the first and second endplates 1400, 1500 adjacent the first end 1110 of the drive block 1100 (also referred to as "posterior height") is 6.9 mm in the closed position and 10.8 mm in the open position. The height of the expandable interbody device 1000 as measured between the edges of the first and second endplates 1400, 1500 adjacent the second end 1212 of the linkage block 1200 (also referred to as "anterior height") is 8.5 mm in the closed position and 17.5 mm in the open position. The lordosis of the expandable interbody device 1000 as measured between the first sides 1412, 1512 of the first and second endplates 1400, 1500 is 6° in the closed position and 24 degrees in the open position. Also, the rate of change of lordosis for the expandable interbody device 1000 illustrated in FIGS. 1A-7C is greater in relatively earlier stages of the expansion of the expandable interbody device 1000 than in relatively later stages of expansion. For example, the expandable interbody device 1000 illustrated in FIGS. 1A-7C achieves a lordosis of 10 degrees at about 10% expansion from the fully closed position to the open position, a lordosis of 15 degrees at about 30% expansion from the fully closed position to the open position, and a lordosis of 20° at about 60% expansion from the fully closed position to the open position. However, in other implementations, the expandable interbody device 1000 is designed to have any desired change in height, change in lordosis, and rate of change of lordosis.

Figures 8A, 8B:
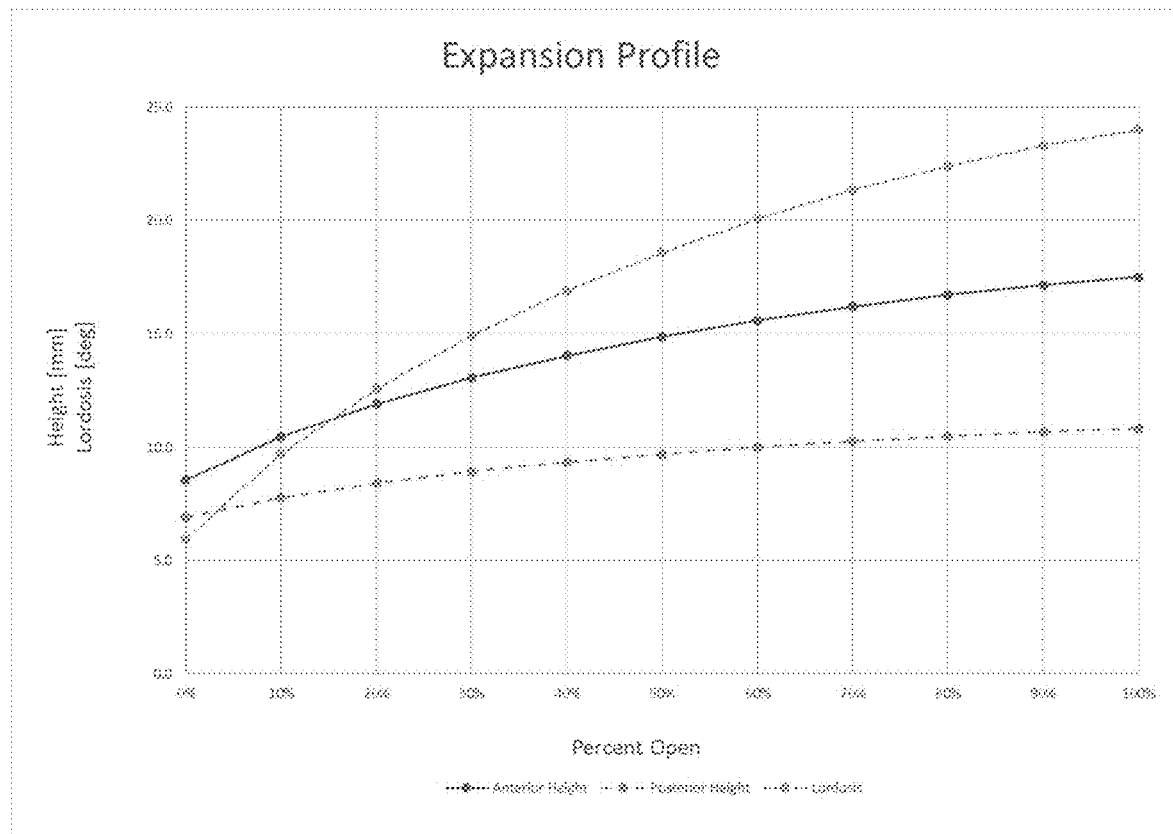
FIGS. 8A and 8B are a table (FIG. 8A) and plot (FIG. 8B) illustrating the example expansion profile of the device of FIG. 1A, according to one implementation.

Referring now to FIGS. 8A and 8B, a table and plot illustrating the example expansion profile of the expandable interbody device 1000 are illustrated. It should be understood that the values in the table and plot are provided only as examples. As described herein, other values for posterior height, anterior height, and/or lordosis can be achieved according to the implementations described herein, for example depending on the sizes and/or requirements for the expandable interbody device 1000, by modifying the expandable interbody device 1000 such that the first and second ramp axes are in a different positions relative to the drive block 1100.

The endplates of the expandable interbody device 1000 illustrated in FIGS. 1A-7C can optionally be partially or fully formed of titanium alloy and the drive block 1100, pins, linkage block 1200, drive screw 1300, and linkages 1600a, 1600b, 1600c, 1600d can optionally be partially or fully formed of a molybdenum alloy, rhenium alloy, or molybdenum-rhenium alloy (MoRe) alloy. However, in other implementations, the parts of the expandable interbody device 1000 are made of any material suitable for implantation in a human body.

A number of implementations have been described. Nevertheless, it will be understood that various modifications may be made without departing from the spirit and scope of the claims. Accordingly, other implementations are within the scope of the following claims.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed:

1. An expandable interbody device; said expandable interbody device comprising:
   a drive block; said drive block at least partially includes a drive block opening;
   a linkage block; said linkage block at least partially includes a linkage block opening;
   a block engagement arrangement;
   a drive screw rotatably coupled within one of said drive block opening or said linkage block opening and threadingly disposed within the other of said linkage block opening or said drive block opening;
   a first endplate and a second endplate; said first endplate includes a first endplate engagement arrangement; said second endplate includes a second endplate engagement arrangement; said first and second endplate engagement arrangements mechanically and slidably engaged to said block engagement arrangement; and, a first linkage arrangement; said first linkage arrangement includes first and second linkages; said first linkage couples said linkage block to said first endplate; said second linkage couples said linkage block to said second endplate;

wherein said drive block, said first endplate and said second endplate each define a respective graft window, wherein said respective graft windows of said drive block, said first endplate and said second endplate are aligned with each other;

wherein rotation of said drive screw simultaneously causes one or more of I) movement of said linkage block relative to said drive block, II) movement of said first endplate relative to said second endplate, and III) said first and/or second endplate engagement arrangements sliding relative to said block engagement arrangement; and wherein said engagement of said first and/or second endplate engagement arrangements with said block engagement arrangement at least partially guides movement of said first endplate and/or said second endplate relative to at least one of said drive block or linkage block during rotation of said drive screw.

2. An expandable interbody device; said expandable interbody device comprising:

a drive block; said drive block includes a drive block opening;

a linkage block; said linkage block includes a linkage block opening;

a block engagement arrangement;

a drive screw that is at least partially positioned within said drive block opening and at least partially position in said linkage block opening;

a first endplate and a second endplate; said first endplate includes a first endplate engagement arrangement; said second endplate includes a second endplate engagement arrangement; said first and second endplate engagement arrangements are configured to engage with said block engagement arrangement; and, a first linkage arrangement; said first linkage arrangement includes first and second linkages; said first linkage rotatably engages said linkage block and rotatably engages said first endplate; said second linkage rotatably engages said linkage block and rotatably engages said second endplate;

a second linkage arrangement; said second linkage arrangement is positioned on an opposite side of said expandable interbody device from said first linkage arrangement; said second linkage arrangement includes first and second linkages; said first linkage of said second linkage arrangement is rotatably coupled to said linkage block and engages said first endplate; said second linkage of said second linkage arrangement is rotatably coupled to said linkage block and engages said second endplate;

wherein rotation of said drive screw causes one or more of I) movement of at least one of said linkage block and said drive block, II) movement of at least one of said first endplate and said second endplate, and III) said first and/or second endplate engagement arrangements moving relative to at least one of said linkage block and said drive block; and wherein said engagement of said block engagement arrangement with said first endplate engagement and said second endplate engagement is configured to at least partially guide movement of said first and/or second endplates relative to said drive block and/or said linkage block during rotation of said drive screw; and wherein each of said drive block, said first endplate and said second endplate includes a graft window; said graft window of said drive block, said first endplate and said second endplate at least partially aligned with one another when said expandable interbody device is in said closed position.

3. The expandable interbody device as defined in claim 2, wherein said block engagement arrangement is at least partially positioned on said drive block.

4. The expandable interbody device as defined in claim 3, wherein said block engagement arrangement includes at least one of a slot, protrusion, rib, rail, or groove; said first endplate engagement arrangement includes at least one of a slot, protrusion, rib, rail, or groove; said second endplate engagement arrangement includes at least one of a slot, protrusion, rib, rail, or groove; said block engagement arrangement and said first endplate engagement arrangement interact with one another to control movement of said first endplate relative to said drive block; said block engagement arrangement and said second endplate engagement arrangement interact with one another to control movement of said second endplate relative to said drive block; said block engagement arrangement is located on said drive block.

5. The expandable interbody device as defined in claim 4, wherein said block engagement arrangement is configured to slidably engage with said first endplate engagement arrangement as said first end plate moves relative to said block engagement arrangement; said block engagement arrangement is configured to slidably engage with said second endplate engagement arrangement as said second end plate moves relative to said block engagement arrangement.

6. The expandable interbody device as defined in claim 5, wherein said drive screw is rotatably coupled within said drive block opening; said drive screw is not threadedly coupled to said drive block; said drive screw is threadedly coupled within said linkage block opening.

7. The expandable interbody device as defined in claim 6, wherein said first endplate engagement arrangement includes alpha and beta first endplate engagement members; said block engagement arrangement includes alpha and beta first block engagement members; said alpha first endplate engagement member is slidably engagable with said alpha first block engagement member; said beta first endplate engagement member is slidably engagable with said beta first block engagement member.

8. The expandable interbody device as defined in claim 7, wherein said second endplate engagement arrangement includes alpha and beta second endplate engagement members; said block engagement arrangement includes alpha and beta second block engagement members; said alpha second endplate engagement member is slidably engagable with said alpha second block engagement member; said beta second endplate engagement member is slidably engagable with said beta second block engagement member.

9. The expandable interbody device as defined in claim 8, wherein said first endplate and said second endplate each include first and second ends; said first end of said first endplate and said second endplate are each positioned at one end of said expandable interbody device and said second end of said first endplate and said second endplate are each positioned at an opposite end of said expandable interbody device; said first end of said first endplate and said second endplate change in spacing from one another as said expandable interbody device moved between an open and closed position; said second end of said first endplate and said second endplate change in spacing from one another as said expandable interbody device moved between an open and closed position.

10. The expandable interbody device as defined in 9, wherein said first linkage of said first linkage arrangement is rotatably coupled to said first endplate; second linkage of said first linkage arrangement is rotatably coupled to said second endplate.

11. The expandable interbody device as defined in 9, wherein said first linkage of said second linkage arrangement is rotatably coupled to said first endplate; second linkage of said second linkage arrangement is rotatably coupled to said second endplate.

12. The expandable interbody device as defined in 10, further including a second linkage arrangement; said second linkage arrangement is positioned on an opposite side of said expandable interbody device from said first linkage arrangement; said second linkage arrangement includes first and second linkages; said first linkage of said second linkage arrangement is rotatably coupled to said linkage block and engages said first endplate; said second linkage of said second linkage arrangement is rotatably coupled to said linkage block and engages said second endplate.

13. The expandable interbody device as defined in 12, wherein said first linkage of said second linkage arrangement is rotatably coupled to said first endplate; second linkage of said second linkage arrangement is rotatably coupled to said second endplate.

14. The expandable interbody device as defined in 13, wherein one of said drive block and said second endplate defines a second slot and the other of said second endplate and said drive block includes a second limit protrusion slidingly that engages within said second slot to prevent overexpansion of said second endplate relative to said drive block.

15. The expandable interbody device as defined in 14, wherein one or more of said first endplate and said second endplate includes a micro-textured surface and/or one or more teeth.

16. The expandable interbody device as defined in claim 2, wherein said block engagement arrangement includes at least one of a slot, protrusion, rib, rail, or groove; said first endplate engagement arrangement includes at least one of a slot, protrusion, rib, rail, or groove; said second endplate engagement arrangement includes at least one of a slot, protrusion, rib, rail, or groove; said block engagement arrangement and said first endplate engagement arrangement interact with one another to control movement of said first endplate relative to said drive block; said block engagement arrangement and said second endplate engagement arrangement interact with one another to control movement of said second endplate relative to said drive block; said block engagement arrangement is located on said drive block.

17. The expandable interbody device as defined in claim 16, wherein said block engagement arrangement is configured to slidably engage with said first endplate engagement arrangement as said first end plate moves relative to said block engagement arrangement; said block engagement arrangement is configured to slidably engage with said second endplate engagement arrangement as said second end plate moves relative to said block engagement arrangement.

18. The expandable interbody device as defined in claim 16, wherein said first endplate engagement arrangement includes alpha and beta first endplate engagement members; said block engagement arrangement includes alpha and beta first block engagement members; said alpha first endplate engagement member is slidably engagable with said alpha first block engagement member; said beta first endplate engagement member is slidably engagable with said beta first block engagement member.

19. The expandable interbody device as defined in claim 16, wherein said second endplate engagement arrangement includes alpha and beta second endplate engagement members; said block engagement arrangement includes alpha and beta second block engagement members; said alpha second endplate engagement member is slidably engagable with said alpha second block engagement member; said beta second endplate engagement member is slidably engagable with said beta second block engagement member.

20. The expandable interbody device as defined in claim 2, wherein said drive screw is rotatably coupled within said drive block opening; said drive screw is not threadedly coupled to said drive block; said drive screw is threadedly coupled within said linkage block opening.

21. The expandable interbody device as defined in claim 2, wherein said first endplate and said second endplate each include first and second ends; said first end of said first endplate and said second endplate are each positioned at one end of said expandable interbody device and said second end of said first endplate and said second endplate are each positioned at an opposite end of said expandable interbody device; said first end of said first endplate and said second endplate change in spacing from one another as said expandable interbody device moved between an open and closed position; said second end of said first endplate and said second endplate change in spacing from one another as said expandable interbody device moved between an open and closed position.

22. The expandable interbody device as defined in 21, wherein said first linkage of said first linkage arrangement is rotatably coupled to said first endplate; second linkage of said first linkage arrangement is rotatably coupled to said second endplate.

23. The expandable interbody device as defined in 2, wherein one of said drive block and said first endplate defines a first slot and the other of said first endplate and said drive block includes a first limit protrusion slidingly that engages said first slot to prevent overexpansion of said first endplate relative to said drive block.

24. The expandable interbody device as defined in 2, wherein one or more of said first endplate and said second endplate includes a micro-textured surface and/or one or more teeth.

25. An expandable interbody device; said expandable interbody device comprising:
  a drive block; said drive block includes a drive block opening;
  a linkage block; said linkage block includes a linkage block opening;
  a block engagement arrangement;
  a drive screw that is at least partially positioned within said drive block opening and at least partially position in said linkage block opening;
  a first endplate and a second endplate; said first endplate includes a first endplate engagement arrangement; said second endplate includes a second endplate engagement arrangement; said first and second endplate engagement arrangements are configured to engage with said block engagement arrangement; and, a first linkage arrangement; said first linkage arrangement includes first and second linkages; said first linkage rotatably engages said linkage block and rotatably engages said first endplate; said second linkage rotatably engages said linkage block and rotatably engages said second endplate;

wherein each of said drive block, said first endplate and said second endplate includes a graft window; said graft window of said drive block, said first endplate and said second endplate at least partially aligned with one another when said expandable interbody device is in a closed position;

wherein rotation of said drive screw causes one or more of I) movement of at least one of said linkage block and said drive block, II) movement of at least one of said first endplate and said second endplate, and III) said first and/or second endplate engagement arrangements moving relative to at least one of said linkage block and said drive block; and wherein said engagement of said block engagement arrangement with said first endplate engagement and said second endplate engagement is configured to at least partially guide movement of said first and/or second endplates relative to said drive block and/or said linkage block during rotation of said drive screw.

26. The expandable interbody device as defined in 25, further including a second linkage arrangement; said second linkage arrangement is positioned on an opposite side of said expandable interbody device from said first linkage arrangement; said second linkage arrangement includes first and second linkages; said first linkage of said second linkage arrangement is rotatably coupled to said linkage block and engages said first endplate; said second linkage of said second linkage arrangement is rotatably coupled to said linkage block and engages said second endplate.

* * * * *